US010444954B2

(12) United States Patent
Zhang et al.

(10) Patent No.: US 10,444,954 B2
(45) Date of Patent: Oct. 15, 2019

(54) DISTINGUISHABLE GEOGRAPHIC AREA PRESENTATION

(71) Applicant: HERE Global B.V., Veldhoven (NL)

(72) Inventors: Xi Zhang, Chicago, IL (US); Xin Chen, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 262 days.

(21) Appl. No.: 14/076,636

(22) Filed: Nov. 11, 2013

(65) Prior Publication Data

US 2015/0135114 A1    May 14, 2015

(51) Int. Cl.
| | |
|---|---|
| G06F 3/0484 | (2013.01) |
| G01C 21/36 | (2006.01) |
| G06F 3/0481 | (2013.01) |
| G06F 16/9535 | (2019.01) |

(52) U.S. Cl.
CPC ....... *G06F 3/04842* (2013.01); *G01C 21/367* (2013.01); *G06F 3/04815* (2013.01); *G06F 16/9535* (2019.01)

(58) Field of Classification Search
CPC ..................... G01C 21/3667; G01C 21/367
See application file for complete search history.

(56) References Cited

U.S. PATENT DOCUMENTS 6,111,983 A *  8/2000  Fenster ................ G06K 9/6206
                                                              382/173
9,534,916 B2 * 1/2017  Geelen ............... G01C 21/3635
2003/0147553 A1 * 8/2003  Chen ..................... G01C 11/04
                                                              382/154
2006/0129316 A1 * 6/2006  Park ........................ G01C 21/36
                                                              701/431
2008/0040028 A1    2/2008  Crump
2008/0310756 A1 * 12/2008  Tao ........................ G06T 7/0051
                                                              382/285

(Continued)

FOREIGN PATENT DOCUMENTS

EP          1 936 585 A1    6/2008
WO    WO 2010/040400 A1    4/2010

OTHER PUBLICATIONS

Christopher C. Miller, "A Beast in the Field: The Google Maps Mashup as GIS/2", Cartographica, Fall, 2006, pp. 187-199, vol. 41, No. 3.

(Continued)

*Primary Examiner* — Abdullah Al Kawsar
*Assistant Examiner* — David V Luu
(74) *Attorney, Agent, or Firm* — Alston & Bird LLP

(57) ABSTRACT

A method and apparatus for rendering geographic areas involves presenting at least part of the geographic area in a distinctive fashion. An area of interest is identified. A location of the area of interest as a geographic sub-area within a geographic area is determined. A representation of the area of interest within an electronic model of the geographic area is located. A view of the electronic model of the geographic area comprising the representation of the area of interest is selected, and the view of the electronic model with the area of interest having a different display characteristic than other geographic sub-areas shown in the view is presented. The different display characteristic distinguishes the area of interest from the other geographic sub-areas.

14 Claims, 9 Drawing Sheets

(56) References Cited

U.S. PATENT DOCUMENTS

| | | | | |
|---|---|---|---|---|
| 2008/0312942 | A1* | 12/2008 | Katta | G06Q 10/04 |
| | | | | 705/7.34 |
| 2009/0024315 | A1 | 1/2009 | Scheibe | |
| 2009/0110327 | A1* | 4/2009 | Chen | G06T 17/10 |
| | | | | 382/285 |
| 2011/0029227 | A1* | 2/2011 | Geelen | G01C 21/3635 |
| | | | | 701/532 |
| 2011/0075882 | A1* | 3/2011 | Guo | G06T 7/0042 |
| | | | | 382/100 |
| 2011/0144909 | A1* | 6/2011 | Ren | G01C 21/3638 |
| | | | | 701/455 |
| 2011/0216962 | A1* | 9/2011 | Kim | G06T 7/507 |
| | | | | 382/154 |
| 2012/0254186 | A1 | 10/2012 | Winner et al. | |
| 2013/0047120 | A1 | 2/2013 | Albright | |
| 2013/0080504 | A1* | 3/2013 | Maurer | G06F 17/30241 |
| | | | | 709/203 |
| 2013/0173154 | A1 | 7/2013 | Wither et al. | |
| 2013/0321398 | A1* | 12/2013 | Howard | G06T 19/00 |
| | | | | 345/419 |

OTHER PUBLICATIONS

Map Maker Basics—Map Makepedia [online] [retrieved Aug. 1, 2013], Retrieved from the Internet: <URL: https://sites.google.com/site/mapmakerpedia/maps-101/map-maker-basics>. (undated) 7 pages.

\* cited by examiner

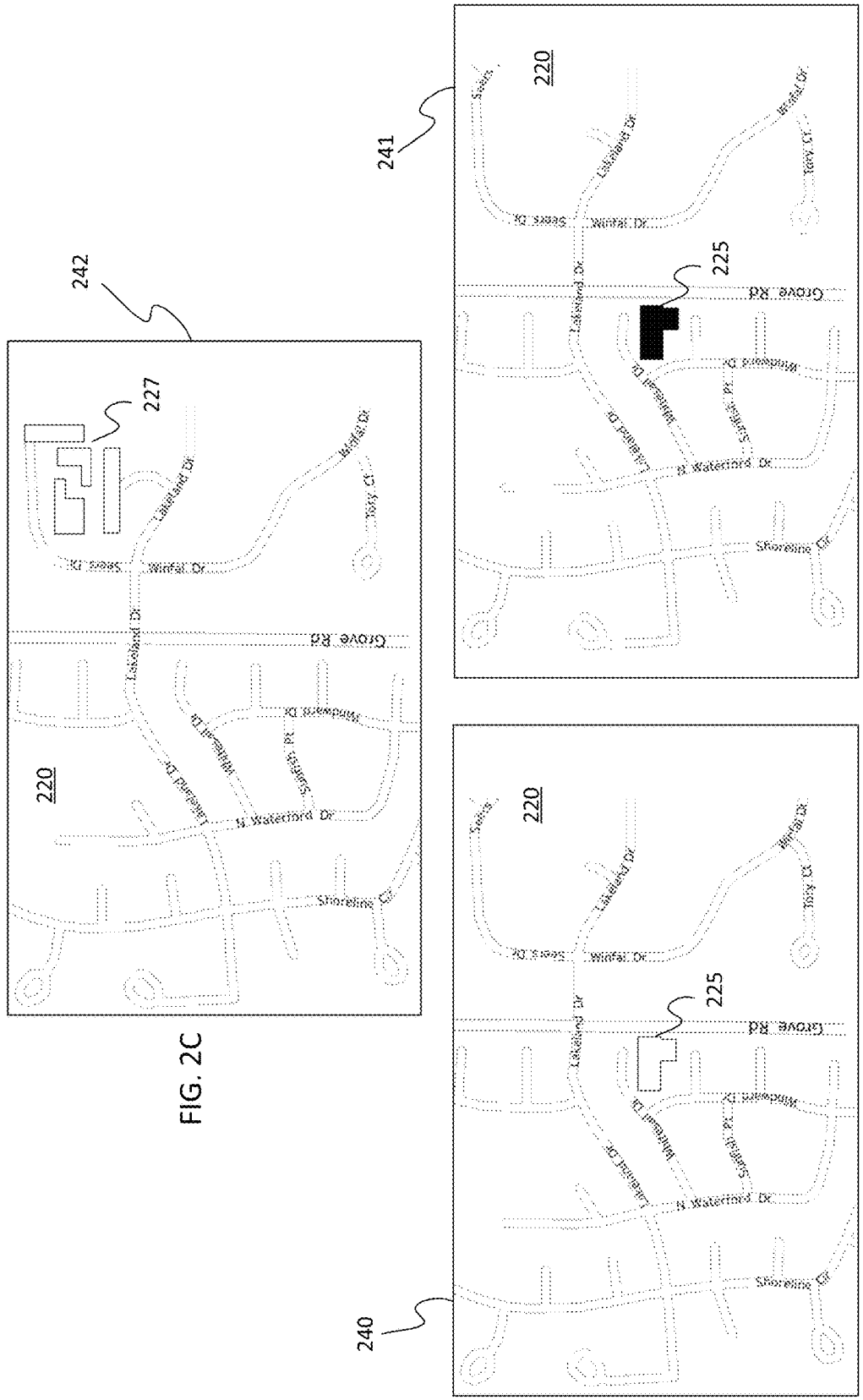

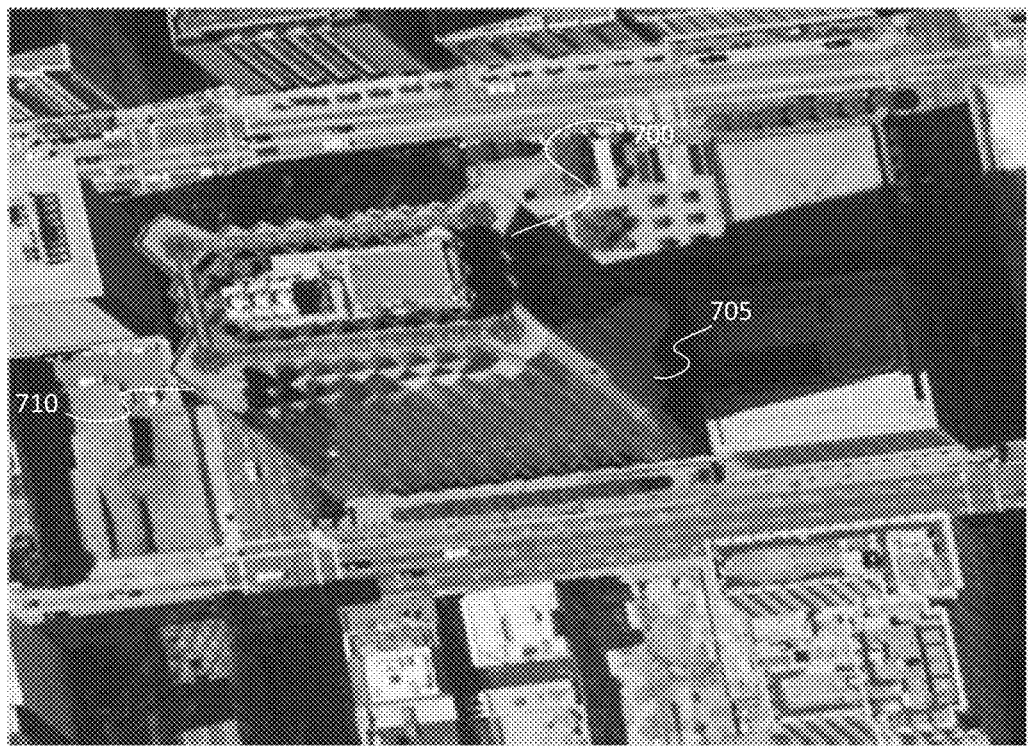
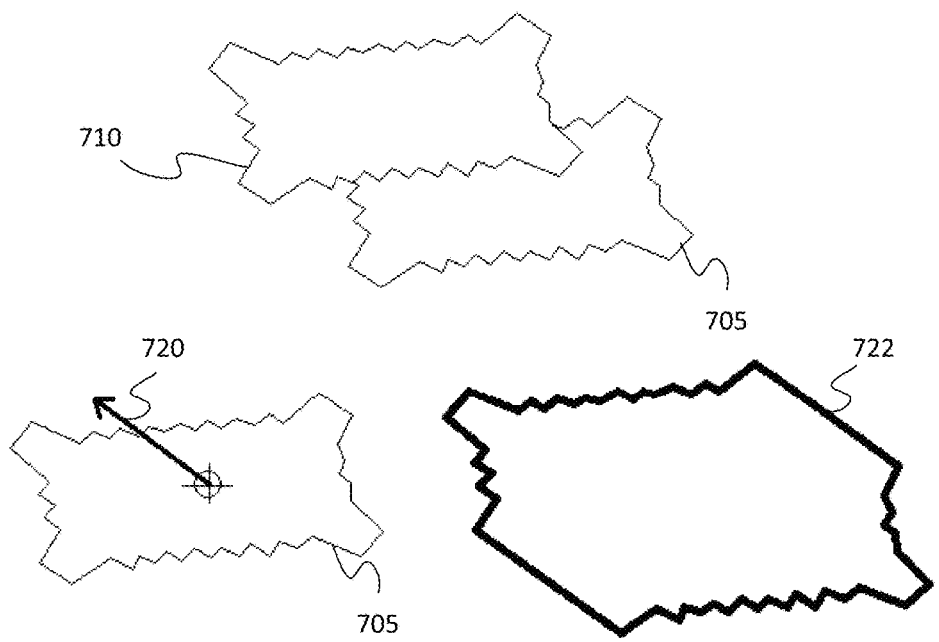
FIG. 8

DISTINGUISHABLE GEOGRAPHIC AREA PRESENTATION

FIELD

The following disclosure relates rendering geographic areas and geographic area rendering related applications, and more specifically to rendering a geographic area for display with a distinguishable area of interest.

BACKGROUND

Users may request information related to geographic areas. The information may be provided as specific location information such as an address within a geographic location, a particular point of interest within a geographic area, a general structure or building within a geographic area, or any number of references to specific locations within the geographic area.

Providing a visual representation of the geographic area containing the specific location information may be confusing for a user. Placing an indicator on a geographic point in a map or other geographic model may not adequately describe the entirety of the specific location information, particularly if the specific location information refers to a location with multiple entrances, multiple buildings, or other specific location information that encompasses more area than a geographic point.

SUMMARY

In an embodiment, a method involves identifying an area of interest. A location of the area of interest as a geographic sub-area within a geographic area may be determined. A representation of the area of interest within an electronic model of the geographic area may be located. A view of the electronic model of the geographic area comprising the representation of the area of interest may be selected, and the view of the electronic model with the area of interest having a different display characteristic than other geographic sub-areas shown in the view may be presented. The different display characteristic distinguishing the area of interest from the other geographic sub-areas of the presented view.

In an embodiment an apparatus includes a memory configured to store an electronic model of a geographic area comprised of a plurality of geographic sub-areas. The apparatus may also include a controller configured to identify an area of interest. The controller may also be configured to determine a location of the area of interest as one of the geographic sub areas as a geographic sub-area of the plurality of geographic sub-areas. The controller may also be configured to locate a representation of the area of interest within the electronic model of the geographic area. The controller may also be configured to select a view of the electronic model of the geographic area comprising the representation of the area of interest. The apparatus may also include a display configured to present the view of the electronic model with the area of interest having a different display characteristic than other geographic sub-areas shown in the view, the different display characteristic distinguishing the area of interest from the other geographic sub-areas.

In an embodiment, a non-transitory computer readable medium may include instructions that when executed on a computer are operable to identify an area of interest. The instructions may also be operable to determine a location of the area of interest as one of the geographic sub-areas. The instructions may be further operable to locate a representation of the area of interest within the electronic model of the geographic area. The instructions may then be operable to select a view of the electronic model of the geographic area comprising the representation of the area of interest, and present the view of the electronic model with the area of interest having a different display characteristic than other geographic sub-areas shown in the view, the different display characteristic distinguishing the area of interest from the other geographic sub-areas.

BRIEF DESCRIPTION OF THE DRAWINGS

Exemplary embodiments of the present invention are described herein with reference to the following drawings.

FIGS. 2A-2C illustrate presentations of a geographic area.

FIG. 8 illustrates imagery used in an electronic model.

DETAILED DESCRIPTION

A user of a device may request information indicating a geographic area of interest. The indicated area of interest may be identified, and a location of the area of interest within a larger geographic area may be determined. A representation of the area of interest may be located or identified in a model of the larger geographic area, and a view of the model displaying a representation of the area of interest may be selected. The view of the model may then be displayed to the user with the area of interest distinctly presented such as to distinguish the area of interest from other areas visible in the view. Presenting entire areas of an area of interest in a view, and distinguishing the areas of interest from other areas of the larger geographic area, may provide more information than providing a singular point location intended to represent an entire area of interest.

Figure 1:
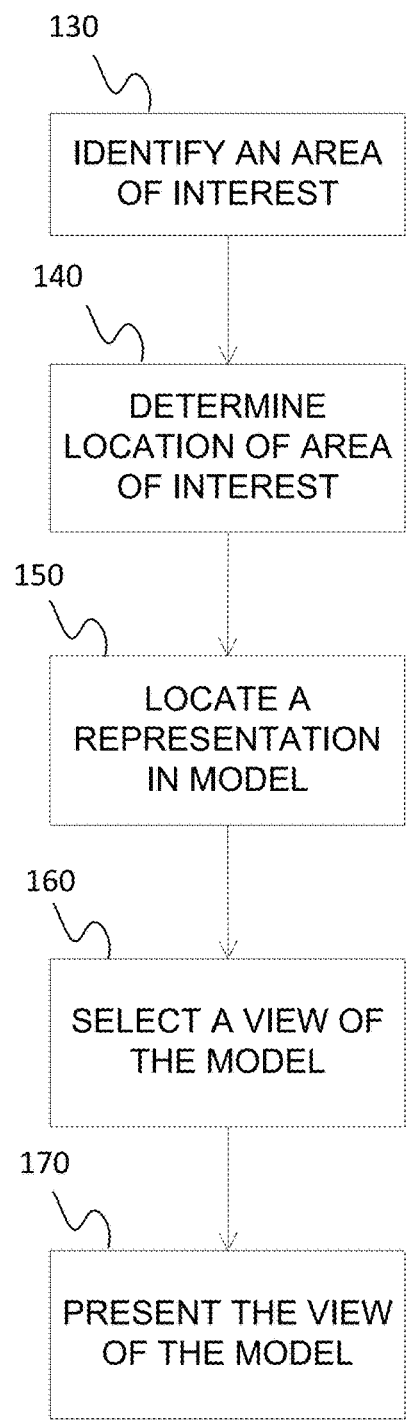
FIG. 1 illustrates an exemplary geographic area presentation method.

FIG. 1 illustrates an exemplary geographic area presentation method.

At act 130 an area of interest may be identified. An area of interest may be a geographic area, or sub-area of a larger geographic area. An area of interest may be a geographic footprint of a structure such as a building, a parking lot, or a wall. An area of interest may involve multiple geographic footprints of multiple structures. An area of interest may also be an overall geographic area of a collective complex of structures, such as a university or corporate complex. An area of interest may also be a structure, or a group of structures, along with an associated geographic area not having structures built thereon. In an embodiment, an area of interest may also have structures associated with the area of interest. The association may exist because the structures are located in or on the area of interest.

An area of interest may be identified for any reason. In an embodiment, an area of interest may be identified as a point of reference for navigation instructions generated by a geographic navigation system. For example, a geographic navigation system may include navigation instructions that indicate a left turn at an area of interest is recommended.

In an embodiment, an area of interest may include a point of interest. Points of interest may include buildings, gas stations, restaurants, lodging, entertainment and educational opportunities (such as amusement parks, water parks, movie theaters, night spots, museums, and libraries), and historical or other types of landmarks or structures. An area of interest may be the geographic footprint of a structure associated with a point of interest. For example, a building may be a point of interest, and the geographic footprint of the building may be an area of interest. A point of interest may involve multiple buildings, and the geographic footprint of multiple buildings associated with the point of interest may be an area of interest.

An area of interest may be identified as a response to a request for information indicating the point of interest. In an embodiment, an area of interest may include, or be associated with, a point of interest, and a request for information may indicate the point of interest. For example, a user may request information indicating a gas station, an indicated point of interest may be the closest gas station in proximity to the user, and the area of interest may be a geographic footprint associated with the closest gas station to the user. The request for information indicating a point of interest need not be information directly requesting a point of interest specifically, but may involve a request for information related to a point of interest. For example, a user may simple provide a request such as "popular movies," and a particular theater may be indicated as a point of interest.

A request for information may be received through any method. In an embodiment a request for information may be received as an entry into an internet search engine. In another embodiment, a request for information may be received as data requested from a geographic database. For example, a user may enter a street address into an internet search engine, or request the address from a geographic database, and an area of interest associated with the address may be indicated. Other geographic locating information based on other geographic locating systems may be used to indicate an area of interest. For example information relating to geographic latitude and longitude, Universal Transverse Mercator (UTM), Universal Polar Stereographic (UPS), stereographic coordinate system, or any other geographic locating system may be used.

At act 140 a location of the area of interest as a geographic sub-area within a geographic area may be determined. A geographic area may include any sized or scaled quantity of geographic content. For example, a geographic area may be a geographic region, such as the state of Illinois in the United States, a metropolitan area, such as the city of Chicago in the state of Illinois, or any smaller or larger quantity of geographic content. Also, any geographic area may be include one or multiple geographic sub-areas including a quantity of geographic content smaller than the geographic area. For example, a geographic area such as the state of Illinois may include a geographic sub-area of the city of Chicago. In this way, geographic areas and sub-area may be any size, but are defined relative to each other such that a geographic area is larger than any geographic sub-area which is included therein. For example, a city block may be a geographic sub-area of a city, and a geographic footprint of a structure may be a geographic sub-area of a city block. A geographic area may also include multiple geographic sub-areas. For example, a geographic area of a city block may include multiple geographic footprints of multiple buildings located on the city block. Each of these geographic footprints may be geographic sub-areas of the city block. Also, geographic sub-areas may not include any structures at all. For example, a geographic area involving a farm may involve multiple geographic sub-areas such as a geographic footprint associated with a farm house and a geographic footprint of a field having no structures contained thereon. Also, in this example, the area of the farm not bounded by the geographic footprints of the farmhouse and field may be considered another geographic sub-area of the total farm geographic area.

At act 150 a representation of the area of interest within an electronic model of the geographic area may be located. An electronic model of a geographic area may be any model that effectively represents a geographic area. For example, an electronic model may be a two dimensional (2D) map, a three dimensional (3D) model, or any combination thereof. In an embodiment, a model may involve a 2D map that includes aligned satellite or aerial imagery of the geographic area represented by the two dimensional map. In another embodiment. In another embodiment, a model may involve a 3D model may including 3D representations of structures located within a geographic area.

A representation of an area of interest may involve any sort or type of representation. In an embodiment involving a 3D model, the representation may involve a 3D model of a structure located on the area of interest. In another embodiment, a representation may be an indication of an area such as a geographic footprint of a structure that is located in the model and associated with the area of interest.

A representation of a geographic area in an electronic model may involve aerial or satellite imagery. Aerial or satellite imagery as used with an electronic model may include any form of pictures or images captured of existing real geographic areas from an elevated, position. For example, photographs may be captured of a geographic area from an airplane, balloon, or other device elevated over a geographic area to place the perspective of the captured photograph in an elevated position. Similarly, satellite imagery may include photographs or other images captured of a geographic area from a device elevated over the geographic area or orbiting a planet. Such imagery may be associated with geographic coordinates of the geographic area the imagery represents, and as such georeferenced in such a way as to allow the imagery's orientation and alignment in an electronic model of a geographic area. In an aerial or satellite imagery embodiment, the image may be taken at an angle relative to a structure, and thus the top of the structure may not be aligned with a georeferenced base of the structure in the image.

At act 160 a view of the electronic model of the geographic area comprising the representation of the area of interest may be selected. The view may be any view of the electronic model that includes the area of interest. Also, a view may be from any perspective relative to the model. For example, aerial, overhead, satellite views may be selected. Also, any perspective or view relative to a model horizon may be selected. For example a street-level, elevated, or angled view with respect to the model horizon may be selected. In an embodiment, views may be bounded by a designated distance away from the area of interest. For example, the view may show a rectangular view of the model, bounded by representations of the geographic area 200 meters North, South, East, and West of a determined centroid of the area of interest. An area of interest may be located at any location within a selected view. For example, the area of interest may be at the center, edge, or off-center of the view. In an aerial or satellite image embodiment, a view of the area of interest may involve areas of the image corresponding to a representation of the structure in the image.

At act 170 a view of the electronic model with the area of interest having a different display characteristic than other geographic sub-areas shown in the view may be shown. In the presented view, the different display characteristic distinguishes the area of interest from the other geographic sub-areas. The different display characteristic may be any display characteristic that when changed indicates a distinction between parts of the model displayed with the different display characteristics. For example, light intensity, coloring choices, color saturation levels, boundary indications, and any other display characteristic for geographic areas or sub-areas may be used as a distinctive characteristic for an identified area of interest as represented in an electronic model.

In an embodiment involving a 3D model or a combination of 3D and 2D models, a view of the geographic area containing the area of interest may be presented with a 3D representation, while the rest of the geographic area, including any other sub-areas of the geographic area displayed in the view, may be represented in a 2D representation. In another embodiment, the 3D structures of the area of interest may be shown with a different external appearance than other structures of the geographic area. For example, the 3D structures of the area of interest may be shown with imagery that resembles an actual appearance of the respective structures in the real world, whereas the other structures of the geographic area may be shown with generic surface coverings, such as all externally gray in color. A different external appearance may involve a defined outline of a structure located in the area of interest. Such an outline may be displayed using highlighting to differentiated the outline of the structure from the rest of the model in the view.

In an embodiment, the differentiating display characteristic may involve a highlighted outline of a geographic footprint of the area of interest. The outline may be highlighted using any type or technique. For example, the outline may be highlighted using a colored line the follows the geographic path of the outline of the area of interest, whereas other areas or sub-areas of the geographic area may be outlined with a different color of line, or no line at all so that the area of interest is distinguished from the other areas and sub-areas of the geographic area.

In an embodiment, a 2D model using aerial or satellite imagery may involve a highlighted visible outline of a structure located on an area of interest. In an embodiment, the visible outline may be a boundary of an image area of the imagery presented in a way distinguishing the area of interest, and/or the structure located on an area of interest, from other areas of the imagery.

In an embodiment, the differentiating display characteristic may involve a light saturation level such that the representation of the area of interest appears to be lit or not shaded, however the other areas or sub-area of the geographic area appear to be shaded.

FIGS. 2A-2C illustrate presentations of views 240, 241, 242 of a geographic area 220. The views 240, 241, 242 are presented of a two dimensional (2D) model which may be generally referred to a as a map.

FIGS. 2A and 2B show selected views 240, 241 of an identified area of interest 225 located as a geographic sub-area in the geographic area 220. In FIG. 2A the area of interest 225 has been presented with a visible outline of the area of interest 225 such that the area of interest 225 is distinguished from other areas of the geographic area 240. The outline of the area of interest 225 may correspond to a geographic footprint of a building or structure. A visible outline may be considered a form of highlighting or distinguishing an area of interest. In an embodiment, the visible outline may be presented with a color, such as green or blue, which may further distinguish the area of interest 225. In FIG. 2B a view of the area of interest 225 is presented with the area of interest 225 colored differently than the other areas of the geographic area 220. Embodiments may involve any type of distinctive coloring choice or scheme. For example, the area of interest 225 may be colored green, whereas the other areas or sub-areas of the geographic area 220 may be colored in a neutral tan or yellow.

In FIG. 2C a view of an area of interest 227 in a geographic area 220 is presented with the area of interest 227 having a visible outline. The area of interest 227 in the geographic area 220 involves a visible outline of the footprints of multiple structures that together can be considered the area of interest 227. It can be seen that this type of view presentation may provide enough information to indicate that the area of interest 242 may be accessible using Lakeland Dr. or Seers Dr.

Figure 3A:
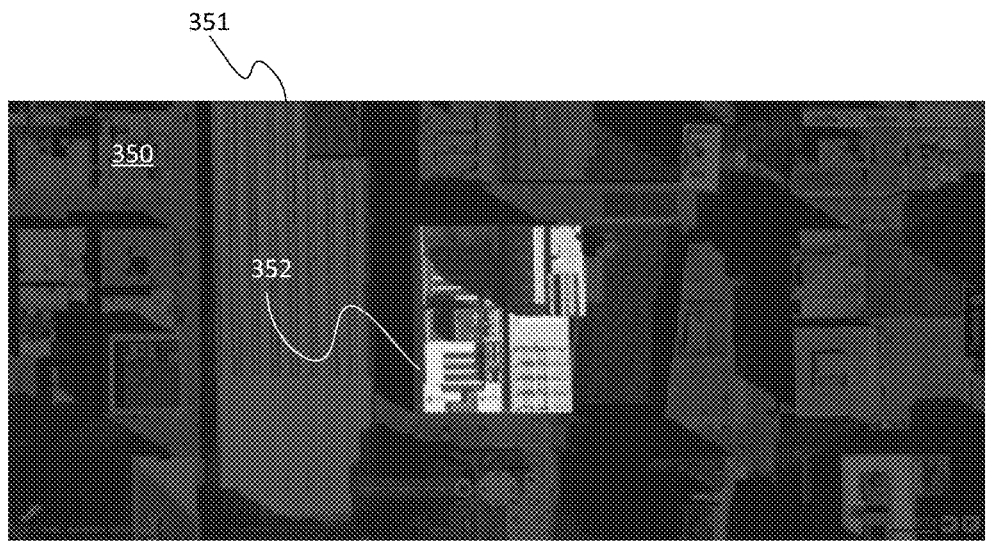
FIGS. 3A-3B illustrate presentations of geographic areas.
Figure 3B:

FIGS. 3A-3B illustrate presentations of views 351, 361 of geographic areas 350, 360 that include areas of interest 352, 362.

FIG. 3A shows a 3D model of a geographic area 350. The particular view of the 3D model shows an area of interest 352 with a lighting level or intensity display characteristic that presents the area of interest 352 in a lit or not shaded manner, with the rest of the area of the geographic area shown in a shaded manner. This type of display characteristic differentiation may also be used with 2D models, and 2D models having associated and aligned aerial or satellite imagery.

FIG. 3B shows an electronic model of a geographic area 361 that involves a 2D map with georeferenced satellite imagery that has been aligned to the 2D map. The presented view 361 shows an area of interest 362 with a visible or highlighted outline. The area of interest 362 involves multiple included buildings and structures, and this type of distinguishing display characteristic involves a visible outline of a collective geographic area that makes up the area of interest 362. The area of interest 362 may be a point interest, such as a university or other organization.

Figure 7:
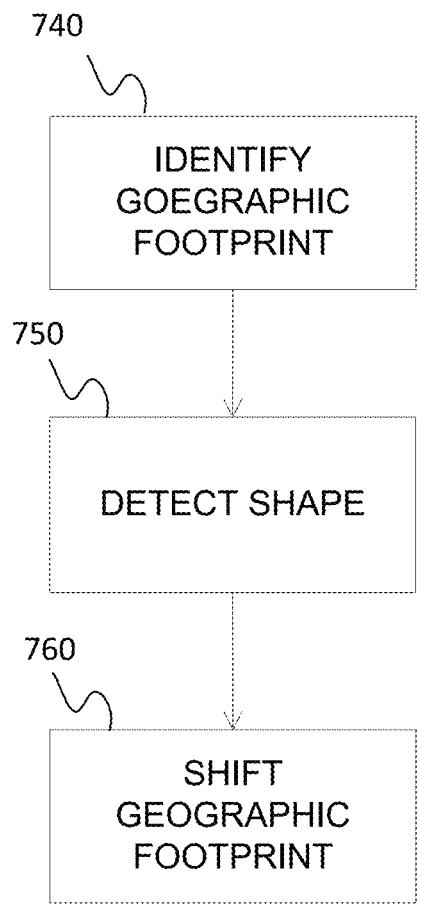
FIG. 7 shows a flow chart of an embodiment involving presenting a view of a 2D model using aerial or satellite imagery.

FIG. 7 shows a flow chart of an embodiment involving presenting a view of a 2D model using aerial or satellite imagery. Building or structure geographic footprints may be georeferenced to position them within an electronic model of a geographic area. The dimension and shape of the geographic footprints may associated in the model with areas of interest or points of interest. The imagery may involve images taken at an angle relative to structures located on an area of interest. The relative angle may produce an image having a visible portion of a structure shifted such that it does not align with a georeferenced footprint of the structure. Areas of the imagery representing structures on an area of interest may be determined, including areas of the imagery not perfectly corresponding to geographic footprints of structures In act 740 a geographic footprint of a structure located on the area of interest is identified. The geographic footprint may be identified based on a georeferenced footprint of the structure as defined in a model.

In act 750 a shape corresponding to the geographic footprint of the structure is detected in the imagery. The shape may be detected using any technique. In an embodiment, the imagery may be segmented to determine shapes represented in an image, and a template matching algorithm may be used to match a georeferenced geographic footprint of a structure to a corresponding shape in the imagery. Any template matching algorithm may be used. For example, Chamfer matching techniques or Hausdorf matching techniques may be used.

In act 760, a geographic footprint is shifted to the detected shape to define an area of the imagery defining an outline of the structure. The geographic footprint may be shifted using any technique. In an embodiment, a translation vector is calculated defining a shift of the geographic footprint to the location of the detected shape in the imagery. The translation vector may be calculated using any technique. For example, the translation vector may be defined by the shift of a determined centroid of the geographic footprint to the centroid of the detected shape in the imagery. Once the translation vector is calculated, the geographic footprint may be shifted along the translation vector to encompass the intermediate areas of the image between the geographic footprint and the detected shape. The outline of the area defined by the shifting of the geographic footprint may define the outline of the structure in the imagery.

In an embodiment, presenting a view of the area of interest involves presenting a view of a structure located on the area of interest having a different display characteristic based on an outline of the structure in aerial or satellite imagery. For example, the outline of the structure may be displayed using a highlight to differentiate the area defined by the highlight from the rest of the areas of a geographic region represented in an image displayed in a view.

Figure 9:
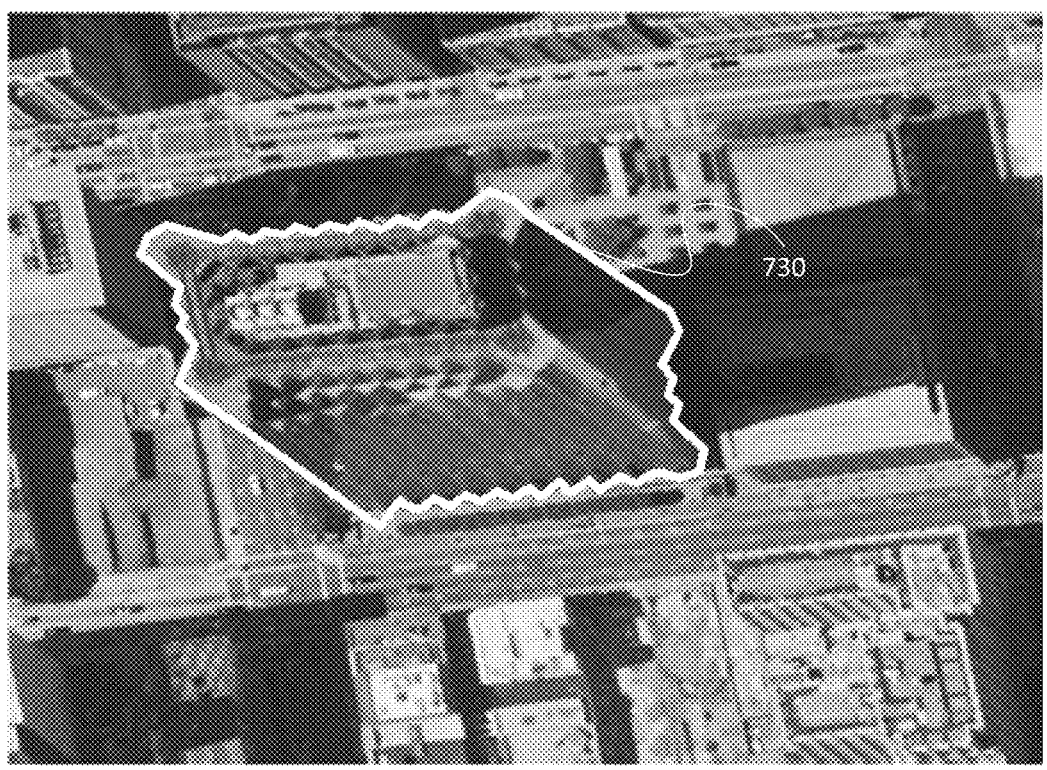
FIG. 9 illustrates a view of imagery with an outline of a structure highlighted.

Aerial or satellite imagery may be georeferenced and positioned in an electronic model such that an image correlating to a geographic footprint of a structure may be determined and aligned with the base of a structure as the structure appears in the imagery, as is shown in FIG. 8. In some instances a base 705 of a structure 700 may not be visible and a top 710 or roof of a structure corresponding to a geographic footprint may be offset or shifted from the base due to the techniques used in creating the imagery. A display characteristic distinguishing an area of interest that involves such imagery in an electronic model may involve determining or calculating a translation vector 720 between the base 705 and top 710 of a represented structure. This translation vector 720 may measure the shift from the structure base 705 to the structure top 710. A template matching algorithm may be used to match a geographically known base 705 to a corresponding top 710 in the imagery. Any template matching algorithm may be used. For example, Chamfer matching techniques or Hausdorf matching techniques may be used. Once a structure base 705 and top 710 pair are detected, a distance and direction offset from each other may be determined using any geometric measuring technique to determine the translation vector for the structure as represented in the imagery. Identifying a structure top 710 and base 705, along with the displacement vector 720 may allow the identification of the parts of the imagery that represent the structure corresponding to an area of interest by following the vector from the base 705 to the top 710 including the intervening areas of the image bounded by the geometry of the base 705, thus defining a structure outline 722 defining an area of the imagery representing the structure. The corresponding parts of the imagery may then be presented with distinctive display characteristics that distinguish the area of interest and the corresponding structure from other areas of a view of a geographic area. For example, the corresponding imagery may be outlined 730 or be displayed with distinctive colors to distinguish the structure in the area of interest, as is shown in FIG. 9.

Figure 4:
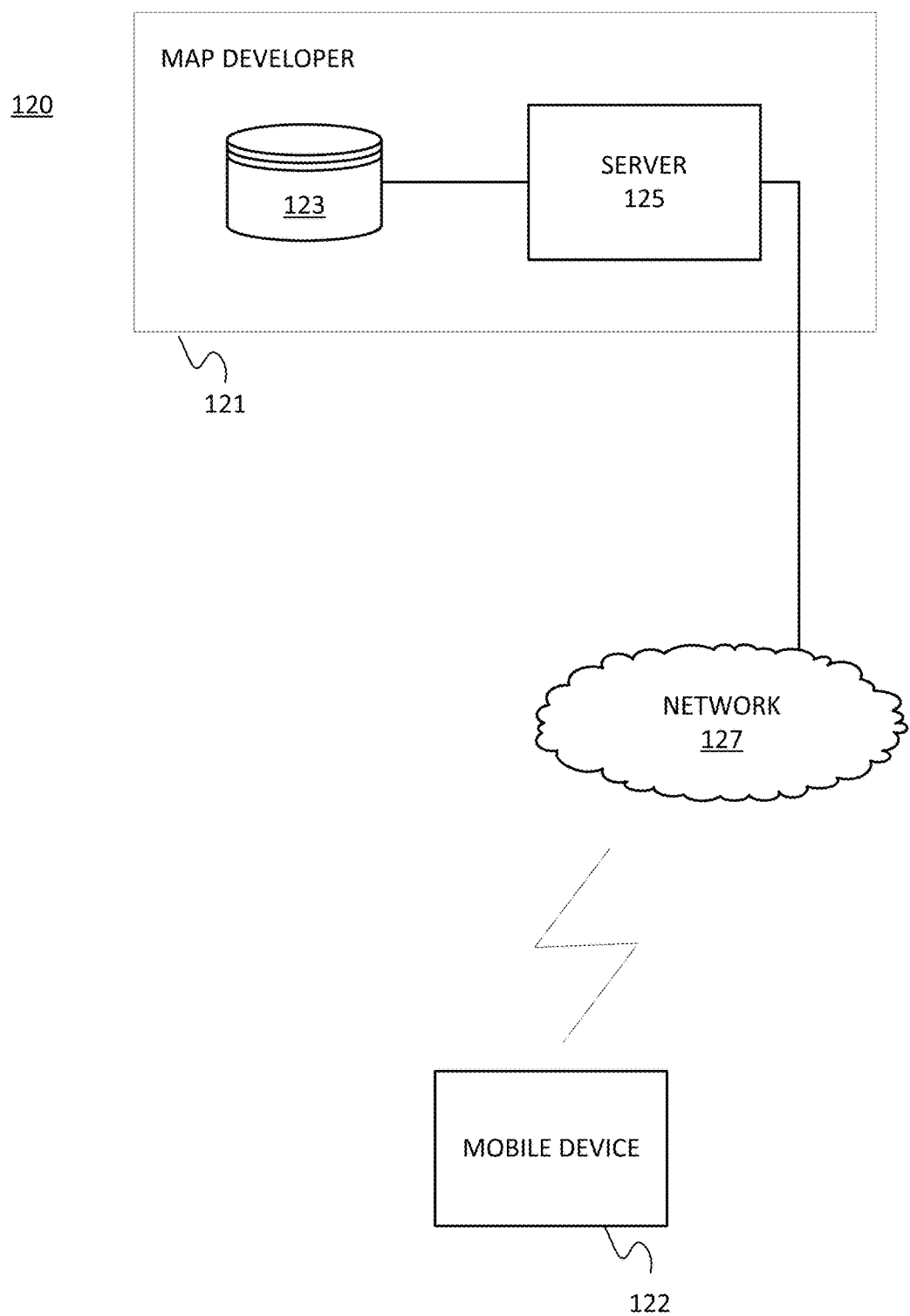
FIG. 4 illustrates an exemplary networked model system for image enhancement.

FIG. 4 illustrates an exemplary networked model and mapping system 120 for geographic area presentation. The mapping system 120 includes a map developer system 121, a mobile device 122, and a network 127. Additional, different, or fewer components may be provided. For example, many mobile devices 122 may connect with the network 127.

The developer system 121 includes a server 125 and a database 123. The developer system 121 may include computer systems and networks of a system operator such as NAVTEQ or Nokia Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for mapping and navigation-related applications. The geographic data may include data representing a road network including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may be correlated to a three dimensional model representing a geographic area. The database 123 may also include, or be coupled with, the three dimensional model, as well as points of interest and the geographic locations of points of interest. These points of interest may be correlated to the three dimensional model using the geographic data. Examples of points of interest include gas stations, restaurants, lodging, entertainment and educational opportunities (such as amusement parks, water parks, movie theaters, night spots, museums, and libraries), and historical or other types of landmarks. The database 123 may include geographic footprints of areas of interest. The areas of interest may be associated with points of interest.

The mobile device 122 includes one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122.

The mobile device 122 may communicate data that identifies an area of interest via the network 127 to the server 125. The server 125 may identify an area of interest from the data, determine a location of the area of interest as a geographic sub-area of the plurality of geographic sub-areas, locate a representation of the area of interest within an electronic model of the geographic area stored in the geographic database 123, and select a view of the electronic model of the geographic area comprising the representation of the area of interest. The view may be communicated via the network 127 to the mobile device 122. The mobile device may display the view of the electronic model with the area of interest having a different display characteristic than other geographic sub-areas shown in the view, the different display characteristic distinguishing the area of interest from the other geographic sub-areas.

The computing resources for identifying, determining, locating, selecting, and presenting may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 5:
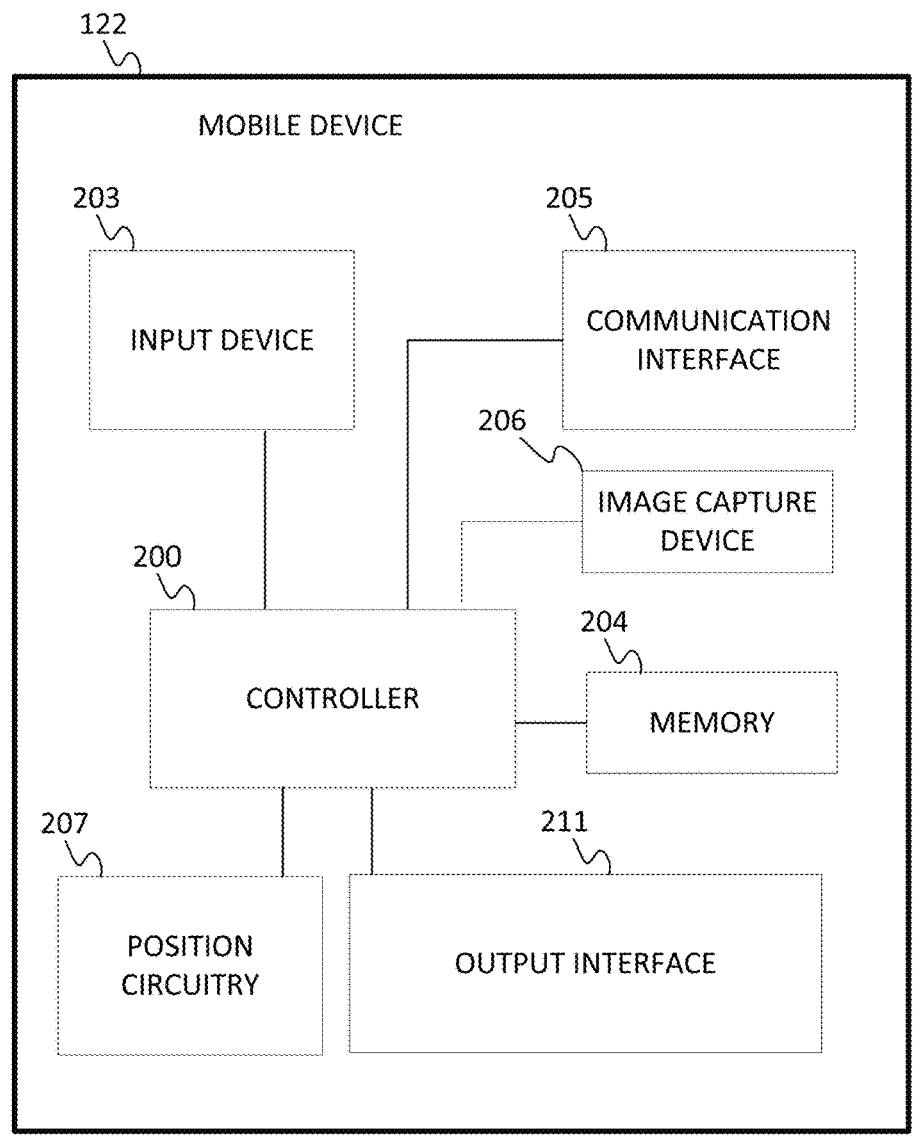
FIG. 5 illustrates an exemplary mobile device for geographic area presentation.

FIG. 5 illustrates an exemplary mobile device 122 for geographic area presentation. The mobile device 122 includes a controller 200, a memory 204, an input device 203, a communication interface 205, position circuitry 207, an image capture device 206, and an output interface 211. The output interface 211 may present visual or non-visual information such as audio information. The output interface 211 may be operational to display images and views of electronic models. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, a camera, and/or any other known or later developed mobile device. The positioning circuitry 207, which is an example of a positioning system, is configured to determine a geographic position of the mobile device 122.

The positioning circuitry 207 may include suitable sensing devices that measure the traveling distance, speed, direction, orientation, and so on, of the mobile device 122. The positioning system may also include a receiver and correlation chip to obtain a GPS signal. Alternatively or additionally, the one or more detectors or sensors may include accelerometers, gyroscopes, and/or magnetic sensors built or embedded into or within the interior of the mobile device 122. The accelerometer is operable to detect, recognize, or measure the rate of change of translational and/or rotational movement of the mobile device 122. The gyroscope is configured to generate data indicative of an angle of orientation of the mobile device 122, with regards to a reference plane or horizon reference for multiple angles of tilt related to the mobile device 122. The angle of orientation may be considered a multi-axis tilt measurement. The magnetic sensor, or a compass, is configured to generate data indicative of a heading, or cardinal direction bearing, of the mobile device 122. Data from the accelerometer, the gyroscope, and the magnetic sensor may indicate orientation of the mobile device 122. The mobile device 122 receives location data from the positioning system. The location data indicates the location of the mobile device 122. The location of the mobile device 122 may be used by a navigation system to provide navigation instructions tailored to the current location of the mobile device 122. Location information may also be used to provide points of interest and/or areas of interest a relative to the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

Location data may have spatial and temporal elements. For example, the controller 200 may associate a specific time that a position of the mobile device 122 was determined using the position circuitry 207. The controller 200 may also associate a time with any other action of the mobile device 122. This specific time may be associated with the determined position and saved as location data in memory 204, or transmitted to server 120. Location data with a temporal element may be considered time stamped. A time stamp may also be associated with other mobile device data such as data identifying an area of interest. For example, a time of the placement of a request for a restaurant may indicate a particular restaurant, or point of interest, that is open for business at that time of request. The restaurant may be associated with an area of interest.

The input device 203 may be one or more buttons, keypad, keyboard, mouse, stylist pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The controller 200 may include a general processor, digital signal processor, an application specific integrated circuit (ASIC), field programmable gate array (FPGA), analog circuit, digital circuit, combinations thereof, or other now known or later developed processor. The controller 200 and may be a single device or combinations of devices, such as associated with a network, distributed processing, or cloud computing.

The memory 204 may be a volatile memory or a non-volatile memory. The memory 204 may include one or more of a read only memory (ROM), random access memory (RAM), a flash memory, an electronic erasable program read only memory (EEPROM), or other type of memory. The memory 204 and may be removable from the mobile device 100, such as a secure digital (SD) memory card.

The communication interface 205 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

In an embodiment, the memory 204 is configured to store an electronic model of a geographic area comprised of a plurality of geographic sub-areas. The controller 200 may be configured to identify an area of interest. The controller 200 may also be configured to determine a location of the area of interest as a geographic sub-area of the plurality of geographic sub-areas. The controller 200 may also be configured to locate a representation of the area of interest within the electronic model of the geographic area, and select a view of the electronic model of the geographic area comprising the representation of the area of interest. The output interface 211 may be configured to present the view of the electronic model with the area of interest having a different display characteristic than other geographic sub-areas shown in the view, the different display characteristic distinguishing the area of interest from the other geographic sub-areas.

In an embodiment, the communication interface 205 may be configured to download an entire electronic model of a geographic area, or just a portion of the electronic model corresponding to a view selected of the geographic area including an area of interest.

In an embodiment, the mobile device 122 also includes an image capture device 206. The image capture device 206 may be any device operable to record or create durable images by recording light or other electromagnetic radiation. The image capture device 206 may function chemically by means of light-sensitive material such as photographic film, electronically by using an image sensor (e.g., a charge coupled device) or by any other available mechanism for capturing a physical view of objects and the environment the objects are in. Images captured by the image capture device 206 may be considered mobile images. Images captured by the image capture device 206 may also be considered casually acquired images. The image capture device 206 may have a digital or optical zoom capability. The level of zoom may be associated with an image by the controller 200. The image capture device 206 may be a camera.

Figure 6:
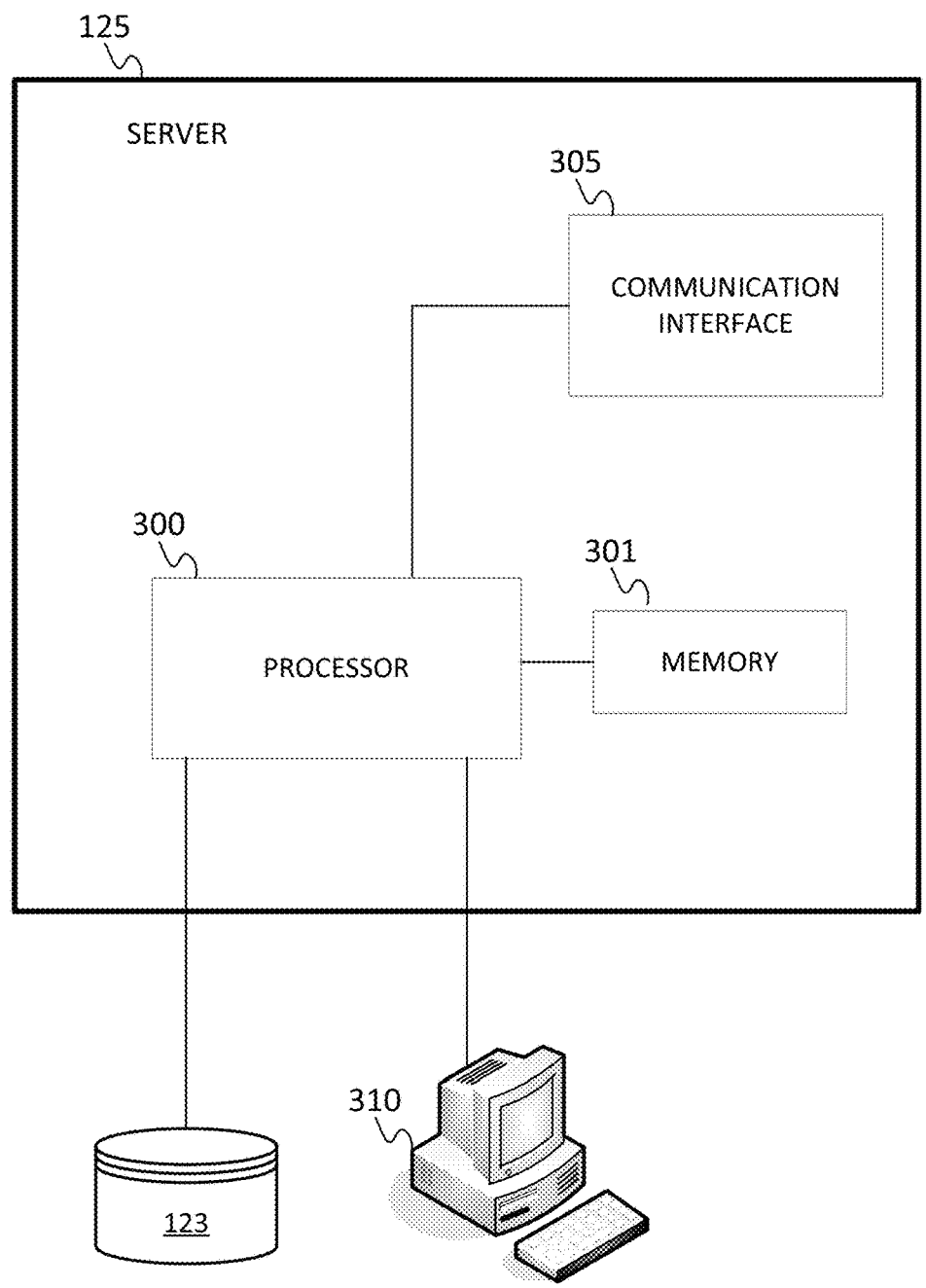
FIG. 6 illustrates an exemplary server for image enhancement.

FIG. 6 illustrates an exemplary server 125 for image enhancement. The server 125 includes a processor 300, a communication interface 305, and a memory 301. The server 125 may be coupled to a database 123 and a workstation 310. The database 123 may be a geographic database containing an electronic model of a geographic area. The workstation 310 may be used as an input device for the server 125. In addition, the communication interface 305 is an input device for the server 125. The communication interface 305 receives data from the mobile device 122 and sends data to the mobile device 122.

The processor 300 may include a general processor, digital signal processor, an application specific integrated circuit (ASIC), field programmable gate array (FPGA), analog circuit, digital circuit, combinations thereof, or other now known or later developed processor. The processor 300 may be a single device or combinations of devices, such as associated with a network, distributed processing, or cloud computing.

The memory 301 may be a volatile memory or a non-volatile memory. The memory 301 may include one or more of a read only memory (ROM), random access memory (RAM), a flash memory, an electronic erasable program read only memory (EEPROM), or other type of memory.

The communication interface 305 may include any operable connection. An operable connection may be one in which signals, physical communications, and/or logical communications may be sent and/or received. An operable connection may include a physical interface, an electrical interface, and/or a data interface. The communication interface 305 provides for wireless and/or wired communications in any now known or later developed format.

In an embodiment, the memory 301 is configured to store an electronic model of a geographic area comprised of a plurality of geographic sub-areas. A processor 300 may be configured identify an area of interest and determine a location of the area of interest as a geographic sub-area of the plurality of geographic sub-areas. The processor 300 may be further configured to locate a representation of the area of interest within the electronic model of the geographic area, and select a view of the electronic model of the geographic area comprising the representation of the area of interest. The processor 300 may also be configured to cause a display of the view of the electronic model with the area of interest having a different display characteristic than other geographic sub-areas shown in the view, the different display characteristic distinguishing the area of interest from the other geographic sub-areas.

The communication interface 305 may be configured to receive input indicating a point of interest or identifying an area of interest. The communication interface 305 may also be configured to communicate a model of a geographic area to a mobile device 122. The communication interface 305 may also be configured to communicate a view of a model of a geographic area, along with any information associated with the model.

The workstation 310 may contain a display to display a model, and image or a combined stereoscopic image created from the combination of model data and image data. In an embodiment, information indicating a point of interest or an area of interest may be entered using the workstation 310. The workstation 310 may also be configured to display a view of a model of a geographic area.

In an embodiment, the model is supplemented by the geographic database 123 to associate points of interest from the geographic database 123 with specific locations of the model and associated areas of interest. The geographic database 123 and the model may be aligned using a common coordinate system. This coordinate system may also be aligned with a corresponding real-world geographic coordinate system.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method comprising:
    receiving, by a processor, a search request for map data;
    identifying, with the processor, an address related to the search request comprising one or more structures within one or more geographic sub-areas;
    providing, by the processor, a two dimensional photographic image captured of a geographic area from an elevated position, the geographic area including the address;
    identifying, with the processor, in the photographic image, a structure roof within the one or more geographic sub-areas associated with the address;
    identifying, with the processor, in the photographic image, a geographic footprint of the one or more structures within the one or more geographic sub-areas associated with the address;
    determining, with the processor, a non-zero distance offset and a non-zero direction offset between the geographic footprint and the identified structure roof;
    generating, with the processor, a highlighted outline of the one or more structures using the geographic footprint, the identified structure roof, the distance offset, and the direction offset, wherein the generating comprises shifting the geographic footprint toward the identified structure roof using the translation vector to generate the highlighted outline of the one or more structures; and
    rendering a three-dimensional view of the one or more structures within the photographic image with the one or more structures having a different display characteristic than other areas shown in the view, the different display characteristic comprising the generated highlighted outline of the one or more structures distinguishing the three-dimensional view of the highlighted outline of the one or more structures from the other geographic sub-areas.

2. The method of claim 1, wherein the photographic image comprises a view of satellite imagery of the geographic area.

3. The method of claim 1, wherein the different external appearance comprises a light saturation level such that the other 3D structures of the 3D model visible within the view are shaded whereas the 3D representation of the structure outline is not shaded.

4. The method of claim 1, wherein the search request is received as data requested from a geographic database.

5. The method of claim 1, wherein the destination comprises a point of reference for navigation instructions generated by a geographic navigation system.

6. The method of claim 1, wherein calculating the highlighted outline of one or more structures uses a Chamfer matching technique.

7. The method of claim 1, wherein calculating the highlighted outline of one or more structures uses a Hausdorf matching technique.

8. An apparatus comprising:
at least one memory configured to store a satellite imagery view in two dimensions of a geographic area comprised of a plurality of geographic sub-areas; and
at least one controller configured to:
identify an address comprising one or more structures within one or more geographic sub-areas;
identify a geographic footprint of the one or more structures within the one or more geographic sub-areas in the satellite imagery view related to the address;
identify a roof of the one or more structures within the one or more geographic sub-areas in the satellite imagery view related to the address;
generate a highlighted outline of the one or more structures using the geographic footprint, the identified structure roof, and a translation vector, wherein the translation vector is based on a non-zero distance offset and a non-zero direction offset between the geographic footprint and the identified structure roof, wherein the generating comprises shifting the geographic footprint toward the identified structure roof using the translation vector to generate the highlighted outline of the one or more structures; and
cause a display of the satellite imagery view with a three-dimensional view of the structure having a different display characteristic than other areas shown in the view, the different display characteristic comprising the generated highlighted outline of the one or more structures distinguishing the three-dimensional view of the highlighted outline of the one or more structures from the other geographic sub-areas.

9. The apparatus of claim 8, wherein the highlighted outline of the one or more structures comprises a point of reference for navigation instructions generated by a geographic navigation system.

10. The apparatus of claim 8, wherein the highlighted outline of the one or more structures comprises a point of interest and identifying the highlighted outline of the one or more structures comprises identifying an area of interest as a response to a request for information indicating the point of interest.

11. The method of claim 8, wherein the translation vector is defined by a shift between a centroid of the geographic footprint and a centroid of the detected shape in the satellite imagery view.

12. A non-transitory computer readable medium including instructions that when executed on a computer are operable to:
identify a destination address comprising one or more structures within one or more geographic sub-areas;
identify one or more structures in an overhead two-dimension image view that represent the destination address;
determine a location of the destination address as a geographic sub-area of a plurality of geographic sub-areas;
identify a geographic footprint of the one or more structures within the one or more geographic sub-areas of the one or more structures in the overhead image view;
detect a roof within the one or more geographic sub-areas of the one or more structures in the overhead image view;
calculate a translation vector, wherein the translation vector is based on a non-zero distance offset and a non-zero direction offset between the geographic footprint of the one or more structures and a respective identified structure roof;
generate a highlighted outline of the one or more structures using the geographic footprint, the detected roof, and the translation vector, wherein the generating comprises shifting the geographic footprint toward the identified structure roof using the translation vector to generate the highlighted outline of the one or more structures;
and
render a view of an electronic model of the geographic area comprising the overhead image view and a representation of the destination address, wherein the view of the electronic model with the destination address includes a different display characteristic for a three-dimensional view of the one or more structures associated with the destination address than for other structures associated with other geographic sub-areas shown in the view, the different display characteristic comprising the generated highlighted outline of the one or more structures distinguishing the destination address from the other geographic sub-areas.

13. The medium of claim 12, wherein the different external appearance comprises a light saturation level such that the other structures of view appear shaded whereas the representation of the one or more structures associated with the destination address does not appear shaded.

14. The medium of claim 12, wherein the destination address comprises a point of interest and identifying the destination address comprises identifying the destination address as a response to a request for information indicating the point of interest.

* * * * *

UNITED STATES PATENT AND TRADEMARK OFFICE
CERTIFICATE OF CORRECTION

PATENT NO. : 10,444,954 B2  
APPLICATION NO. : 14/076636  
DATED : October 15, 2019  
INVENTOR(S) : Zhang et al.

Page 1 of 1

It is certified that error appears in the above-identified patent and that said Letters Patent is hereby corrected as shown below:

On the Title Page

Item (71) Applicant reads "HERE Global B.V., Veldhoven (NL)"  
Should read -- HERE Global B.V., Eindhoven (NL) --

Signed and Sealed this  
Eleventh Day of February, 2020

Andrei Iancu  
*Director of the United States Patent and Trademark Office*